United States Patent [19]

Martins Leites et al.

[11] Patent Number: 5,150,517
[45] Date of Patent: Sep. 29, 1992

[54] METHOD OF MANUFACTURING A PISTON

[75] Inventors: Jose M. Martins Leites; Jose A. Cardosomendes; Andre Lippai, all of Sao Paulo; Paulo T. Dellanoce, Sao Caetano Do Sul, all of Brazil

[73] Assignee: Metal Leve S/A Industria E Comercio, Sao Paulo, Brazil

[21] Appl. No.: 687,468

[22] Filed: Apr. 16, 1991

[30] Foreign Application Priority Data

Apr. 17, 1990 [BR] Brazil .................. PI 9001859

[51] Int. Cl.⁵ ............................................ B23P 15/10
[52] U.S. Cl. ......................... 29/888.04; 29/888.042; 92/216
[58] Field of Search ............ 29/888.04, 888.042, 29/888.044, 425, 557; 228/112, 113, 114; 92/216, 208, 222, 224, 231; 123/193 P

[56] References Cited

U.S. PATENT DOCUMENTS

| | | | |
|---|---|---|---|
| 1,667,202 | 4/1928 | Ford | 29/888.042 |
| 2,478,179 | 8/1949 | Brockmeyer | 92/216 |
| 3,424,138 | 1/1969 | Dreisien | 92/216 |
| 4,377,967 | 3/1983 | Pelizzoni | 92/216 |
| 4,603,617 | 8/1986 | Barth et al. | 92/216 |
| 4,709,621 | 12/1987 | Matsui et al. | 28/888.042 |
| 4,727,795 | 3/1988 | Murray et al. | 92/216 |
| 4,847,964 | 7/1989 | Adams et al. | 29/888.042 |
| 4,941,397 | 7/1990 | Kawai et al. | 29/888.042 |
| 5,065,508 | 11/1991 | Lorento et al. | 29/888.042 |

Primary Examiner—Irene Cuda
Attorney, Agent, or Firm—Darby & Darby

[57] ABSTRACT

A method to manufacture an articulated piston head wherein the two portions composing the head, i.e. the top portion and the pin boss portion, are formed separately from blanks of forged or cast chromium-molybdenum steel or a low alloy steel, subjected to preliminary machining operations, joined together by friction welding and then machined to final dimensions.

5 Claims, 1 Drawing Sheet

METHOD OF MANUFACTURING A PISTON

BACKGROUND OF THE INVENTION

The present invention relates to a method for manufacturing an internal combustion engine piston of the two-piece, or articulated, type. In particular, the present invention provides for a method for making the upper, or head, portion of such piston.

The two-piece, or articulated, piston is composed of two parts: the upper part, or head, intended to transmit the pressures generated by the engine combustion, and the lower part, or skirt, whose function is to guide the upper part in the cylinder. The skirt is mounted on a pair of pin bosses depending from the top portion by means of a wrist pin bearing on pin holes provided at the lower ends of the pin bosses.

In high output diesel engines, where the pressures and temperatures within the cylinder are severe, reaching as much as 2,500 psi and 1,000° C. respectively, the upper part of articulated pistons is generally obtained by machining a billet of chromium steel or a low alloy steel, in most cases forged to a shape requiring very little machining to the desired final dimensions. According to the conventional methods, the billet of the selected material is forged in the shape of a cylindrical member integral with two legs depending therefrom known as pin bosses at the ends of which, opposite the cylindrical member, are provided aligned holes. Owing to the said thermomechanical loads, it is customary to provide the underside of the head of such pistons with a peripheral groove which, in association with a peripheral tray or channel on the top of the skirt, will define a cooling chamber designed to remove parts of the heat from the head during engine operation.

However, it has been a difficult task to obtain the final shape of the head for, in addition to the provision of a combustion chamber on the top portion to improve combustion and a plurality of peripheral grooves for the piston rings, there is also the need for carrying out the machining of the top underside to provide the peripheral groove for the cooling chamber. This is a costly process and its application is limited to axisymmetrical chambers, i.e., chambers in which the peripheral groove is concentric with the longitudinal axis of the head. The attempts made heretofore to provide the peripheral groove during the forging operations have resulted in parts having an unacceptable dimensional instability on that portion of the head provided with grooves for the piston rings. In addition, a high rate of tooling damage has been observed.

OBJECT OF THE INVENTION

It is, therefore, one object of the present invention to provide a method to manufacture an articulated piston head in which the two portions comprising the head, i.e. the top and the pin boss portions, are made from separate members and joined to each other by welding subsequent to the provision of a peripheral groove on the underside of the top portion.

It is another object of the present invention to provide an articulated piston head made in accordance with the method of the invention hereinafter described with reference to the figures contained in the accompanying drawing in which:

DETAILED DESCRIPTION OF THE INVENTION

Figure 1:
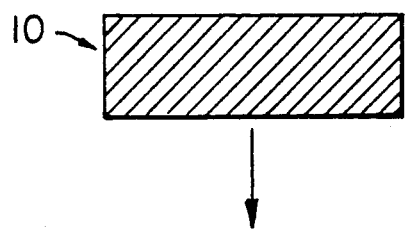
FIG. 1 is a cross sectional view of a blank from which the piston top portion of the invention is made.
Figure 2:
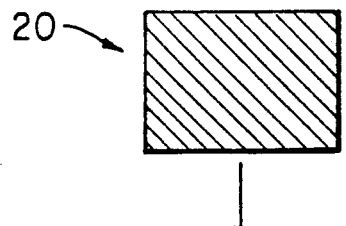
FIG. 2 is a cross sectional view of a blank from which the pin boss portion of the piston of the present invention is made.
Figure 3:
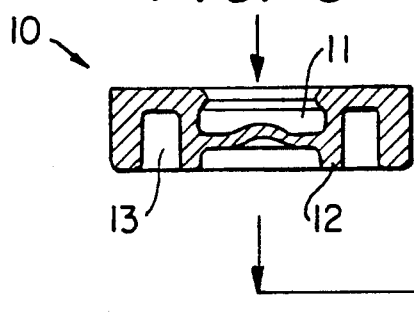
FIG. 3 is a longitudinal section view of the piston top portion already subjected to a first series of machining operations for the provision of a combustion bowl and a peripheral circumferential groove.

According to one preferred embodiment of the present invention, a first metal blank 10, preferably of a substantially cylindrical shape (FIG. 1) is subjected to a first phase of machining operations during which there are provided a combustion bowl 11, a recess 12 on the underside of the combustion bowl 11 and a circumferential groove 13 between the combustion bowl 11 and the outer wall of member 10, as shown in FIG. 3. The metal blank 10 is preferably a forging or casting of a chromium-molybdenum steel alloy, a low alloy steel or another suitable material. The use of a blank having a cylindrical cross section with dimensions close to the final dimensions of the top portion is advantageous for it obviates the need for additional machining operations.

Thereafter, a second metal blank 20 is subjected to a first phase of machining operations at which a narrowing of the section and a circumferential central recess 21 are provided on one of the ends of blank 20 thereby defining a circumferential collar 22. The blank 20 material is preferably one of the materials selected for making the metal blank 10. However, other suitable materials can be used as well.

Figure 4:
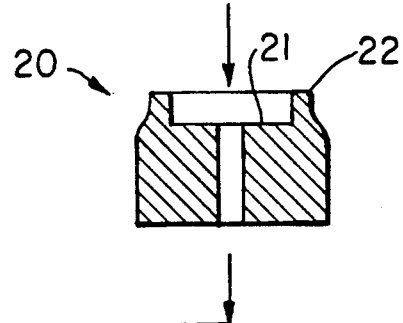
FIG. 4 is a longitudinal section view of the pin boss portion already subjected to a first machining operation.
Figure 5:
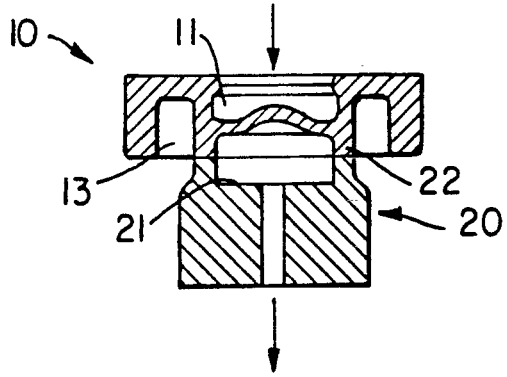
FIG. 5 is a longitudinal section view of the piston head of the present invention composed of the portions shown on FIG. 3 and 4.
Figure 6:
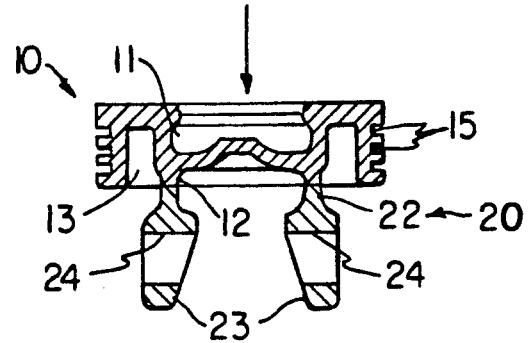
FIG. 6 is a longitudinal section view of the piston head of the invention machined to final dimensions.

Thereafter, the machined members 10 and 20 as shown in FIGS. 3 and 4 are joined together, as depicted in FIG. 5, by bringing in facing relationship the top face of collar 22 and the lower end of the groove 13 inner wall. The process employed to accomplish the joining of members 10 and 20 is the welding method, preferably friction welding, in which the welding is carried out without melting of the materials to be joined, thereby maintaining the structural properties of the materials. Finally, upon completion of the welding operation, the piston head is subjected to the final machining operations with the provision of ring grooves 15, pin bosses 23 and pin holes 24.

What is claimed is:

1. Method of manufacture of a piston of the articulated type, comprising a head with a top portion and a pin boss portion with at least one pin boss and a skirt independent from the said head and mounted on the at least one pin boss by means of a wrist pin bearing in a hole provided on the at least one pin boss, wherein the head is made in accordance with the following steps:

a. subjecting a first metal blank having a substantially cylindrical cross section to machining operations to define an upper combustion bowl, a lower circumferential groove and a lower central recess;

b. subjecting a second metal blank to machining operations to define a circumferential central recess on one of the ends of said blank and narrowing the cross section of said blank around said circumferential central recess thereby defining a collar;

c. bringing the top face of collar in facing relationship with the lower end of the inner wall of said circumferential groove and joining the first and second metal blanks together to form the head;

d. subjecting the head to final machining operations to define ring grooves, the at least one pin boss portion and the holes for the pin boss portion.

2. The method of claim 1 wherein the first and second metal blanks are joined together by welding.

3. The method of claim 1, wherein said first and second metal blanks are forgings or castings.

4. The method of claim 1, wherein said first and second metal blanks are made from a chromium-molybdenum steel or a low alloy steel.

5. The method of claim 2, wherein the joining of said first and second metal blanks is carried out by the friction welding method.

* * * * *